(12) United States Patent
Hold et al.

(10) Patent No.: US 7,659,639 B2
(45) Date of Patent: Feb. 9, 2010

(54) CONNECTION UNIT FOR THE CONNECTION OF ELECTRICAL COMPONENTS TO A MOTOR VEHICLE BATTERY

(75) Inventors: Klaus Hold, Remscheid (DE); Achim Rosemann, Schwelm (DE); Krystian Hirsch, Wuelfrath (DE)

(73) Assignee: Delphi Technologies, Inc., Troy, MI (US)

( * ) Notice: Subject to any disclaimer, the term of this patent is extended or adjusted under 35 U.S.C. 154(b) by 117 days.

(21) Appl. No.: 11/475,636

(22) Filed: Jun. 27, 2006

(65) Prior Publication Data

US 2007/0009786 A1 Jan. 11, 2007

(30) Foreign Application Priority Data

Jun. 27, 2005 (EP) .................................. 05013818

(51) Int. Cl.
*H02H 7/18* (2006.01)
*B60L 1/00* (2006.01)
*B60L 3/04* (2006.01)

(52) U.S. Cl. .................... 307/10.7; 429/61; 429/121; 429/123

(58) Field of Classification Search ................. 307/10.7; 429/61, 121, 123

See application file for complete search history.

(56) References Cited

U.S. PATENT DOCUMENTS

| 4,224,487 | A | * | 9/1980 | Simonsen | ................. 200/61.08 |
| 5,818,122 | A | | 10/1998 | Miyazawa et al. | |
| 5,856,711 | A | * | 1/1999 | Kato et al. | ................. 307/10.6 |
| 5,926,354 | A | | 7/1999 | King | |
| 6,049,140 | A | * | 4/2000 | Alksnat et al. | ............. 307/10.2 |
| 6,417,579 | B1 | * | 7/2002 | Lehnst et al. | .............. 307/10.7 |
| 6,504,344 | B1 | * | 1/2003 | Adams et al. | ............... 320/132 |
| 7,339,774 | B2 | * | 3/2008 | Zdziech et al. | ............. 361/93.1 |

FOREIGN PATENT DOCUMENTS

| JP | 10310004 | 11/1998 |
| WO | 2005/015704 | 2/2005 |

* cited by examiner

*Primary Examiner*—Albert W Paladini
*Assistant Examiner*—Hal I Kaplan
(74) *Attorney, Agent, or Firm*—Thomas N. Twomey

(57) ABSTRACT

The invention relates to a connection unit for the connection of electrical and/or electronic components to a pole of a motor vehicle battery comprising a first conductor section that can be connected to a battery pole; a second conductor section originating from the first conductor section and including a main conductor and a bypass conductor, to which the at least one respective electrical and/or electronic component can be connected; an interruption unit, by which an electrical and/or electronic component connected to the main conductor can be electrically isolated from the battery; and at least one sensor for the measurement of a battery current and/or of a battery voltage.

5 Claims, 1 Drawing Sheet

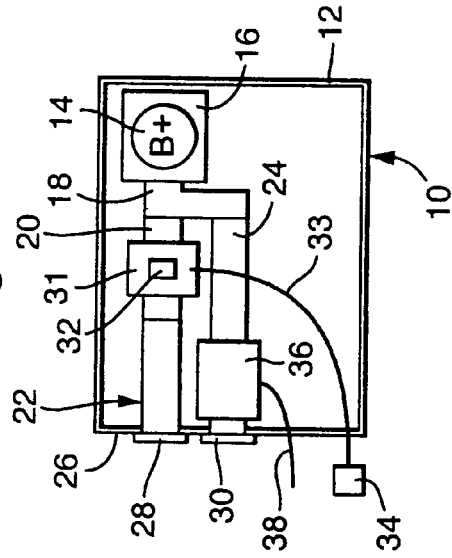
Fig.2.
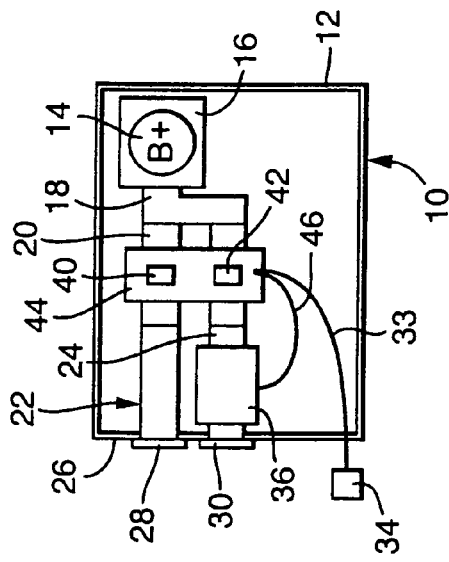
Fig.4.
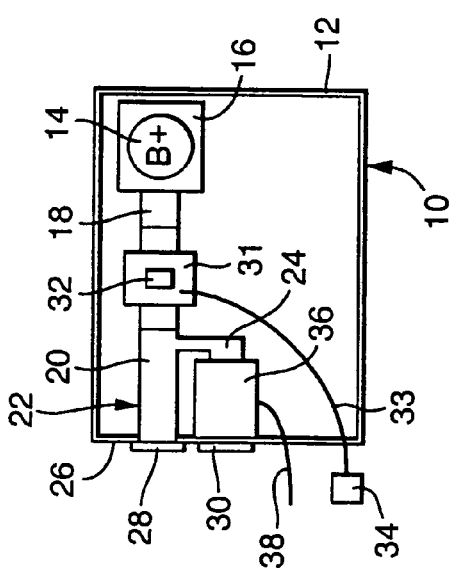
Fig.1.
Fig.3.

CONNECTION UNIT FOR THE CONNECTION OF ELECTRICAL COMPONENTS TO A MOTOR VEHICLE BATTERY

TECHNICAL FIELD

The invention relates to a connection unit for the connection of electrical and/or electronic components to a pole of a motor vehicle battery.

BACKGROUND OF THE INVENTION

Modern motor vehicles are often equipped with a battery management system that facilitates the monitoring of battery current and/or of the battery voltage. In combination with such systems, a connection unit sometimes employed that includes one or more sensors to measure battery current and/or battery voltage and to provide for electrical connection to the negative pole of a motor vehicle battery.

Safety regulations relating to modern motor vehicles may also require that at least the starter, and optionally also the generator of the motor vehicle, be electrically isolated, through automatic means, from the motor vehicle battery in the event of an accident. To meet these requirements, one known connection unit has an interruption unit that interrupts the electrical connection between the motor vehicle battery and the starter and/or the generator on an activation caused by an accident. This known connection unit is provided for a connection to the positive pole of the motor vehicle battery.

SUMMARY OF THE INVENTION

It is the underlying object of the invention to provide a connection unit that satisfies modern safety requirements and simultaneously contributes to a reduction in the costs of a motor vehicle battery management system and simplifies the installation of a motor vehicle battery in and removal of a motor vehicle battery from a motor vehicle.

A connection unit having the features of claim 1 is provided to satisfy the object.

The connection unit in accordance with the invention for the connection of electrical and/or electronic components to a pole of a motor vehicle battery includes a first conductor section that can be connected to the battery pole; a second conductor section originating from the first conductor section and including a main conductor and a bypass conductor, to which at least one respective electrical and/or electronic component can be connected; an interruption unit, by which an electrical and/or electronic component connected to the main conductor can be electrically isolated from the battery; and at least one sensor for the measurement of a battery current and/or of a battery voltage.

The connection unit in accordance with the invention therefore has both an interruption unit for the electrical isolation (i.e., de-coupling, disconnection, cutting-off) of electrical and/or electronic components connected to the battery, e.g. a starter or a generator, and a sensor to measure a battery current and/or a battery voltage. The connection unit in accordance with the invention thus satisfies not only the aforesaid safety regulation, but can also be used in a motor vehicle battery management system.

In accordance with the invention, the interruption unit and the sensor are combined to form one unit and are preferably accommodated in a common housing. The interruption unit and the sensor can consequently be connected to a battery pole, for example to the positive pole or to the negative pole of a motor vehicle battery, in one workstep, i.e. therefore simultaneously. This simplifies the assembly of the interruption unit and the sensor and ultimately simplifies the installation and removal of a motor vehicle battery into a motor vehicle and out of a vehicle respectively.

Furthermore, the common accommodation of the interruption unit and of the sensor in one connection unit signifies a cost saving with respect to the conventional separate arrangement of the sensor and of the interruption unit, since only one common housing has to be manufactured, electrically wired and prepared for the connection of the electrical and/or electronic components.

In accordance with an exemplary embodiment of the invention, wherein a second conductor section comprises both a main conductor and a bypass conductor, and wherein interruption unit is arranged at the main conductor, when the interruption unit is activated, a component connected to the bypass conductor remains connected to the battery. Thusly, only a component connected to the main conductor has to be electrically isolated from the battery. It can be ensured in this manner, for example, that the starter, and optionally also the generator of the motor vehicle, is/are isolated from the battery in the case of an accident, whereas the other electrical consumers of the motor vehicle and in particular an electrical onboard network are still provided with voltage.

Advantageous embodiments of the invention can be seen from the dependent claims, from the description and from the drawing.

In accordance with an exemplary embodiment, a sensor is arranged in the first conductor section. With an arrangement of the sensor of this type, the total battery current flowing through the connection unit can be measured.

In accordance with an alternative embodiment, the sensor is arranged in the second conductor section. Depending on whether the sensor is connected to the main conductor or to the bypass conductor, the part currents flowing through the respective conductor can hereby be measured.

Preferably, a first sensor is connected to the main conductor and a second sensor is connected to the bypass conductor. In this case, both the part flow flowing through the main conductor and the part flow flowing through the bypass conductor can be determined.

In accordance with a further embodiment, a respective interface is provided in each case for the connection of an electrical and/or electronic onboard network of the motor vehicle to the bypass conductor and of a starter and of a generator of the motor vehicle to the main conductor. The interfaces can each be formed by a plug part that can be plugged together with a plug part that is made in a complementary manner and that is connected to a wiring harness leading to the onboard network or to the starter and to the generator. It is ensured by the connection of the onboard network to the bypass conductor and the connection of the starter and of the generator to the main conductor that only the starter and the generator are isolated from the battery on an activation of the interruption unit, whereas a battery voltage is still applied to the onboard network.

In accordance with an alternative embodiment, a respective interface is provided in each case for the connection of an electrical and/or electronic onboard network and of a generator of the motor vehicle to the bypass conductor and of a starter of the motor vehicle to the main conductor. In this case, only the starter is electrically isolated from the battery on an activation of the interruption unit, whereas both the onboard network and the generator remain connected to the battery.

The interruption unit can preferably be activated in dependence on a measured value output by the at least one sensor.

This permits an automatic isolation of an electrical and/or electronic component connected to the bypass conductor from the battery when the sensor detects a current strength exceeding a predetermined threshold value, for example in the case of a conductor short-circuit, and/or detects a current flow in an unwanted direction. The activation signal caused by the sensor is also called an internal signal, since it is generated within the connection unit itself.

Alternatively or additionally, the interruption unit can be activatable by an external signal. A suitable external signal is caused, for example, by a sensor that is provided for the detection of an impending collision, of a sudden deceleration and/or a rolling movement of the motor vehicle. A signal can, for example, be considered that is also used for the activation of an airbag.

In accordance with a further embodiment, the interruption unit has a pyrotechnically actuable interruption element by means of which the main conductor can be isolated on an activation of the interruption unit. The use of a pyrotechnically actuable interruption element permits a particularly fast and effective isolation of the main conductor and thus a fast and reliable isolation of an electrical and/or electronic component connected to the main conductor from the battery.

The interruption of the main conductor can be reversible or irreversible. In the case of an irreversible interruption of the main conductor, the connection unit must be replaced after an activation of the interruption unit, whereas, on a reversible interruption of the main conductor, an electrical and/or electronic component connected to the main conductor can be re-coupled to the battery easily and in particular without replacement of the connection unit while reversing the interruption.

To permit a subsequent calibration of the sensor, the at least one sensor preferably has a shunt resistor.

The battery temperature can furthermore additionally be measurable by the sensor. This permits the monitoring of a further parameter relevant to the battery management.

BRIEF DESCRIPTION OF THE DRAWINGS

The invention will be described in the following purely by way of example with reference to advantageous embodiments and to the enclosed drawing. There are shown:

FIG. 1 is a first embodiment of the connection unit in accordance with the invention;

FIG. 2 is a second embodiment of the connection unit in accordance with the invention;

FIG. 3 is a third embodiment of the connection unit in accordance with the invention; and FIG. 4 is a fourth embodiment of the connection unit in accordance with the invention.

DESCRIPTION OF THE PREFERRED EMBODIMENT

A first embodiment of the connection unit 10 in accordance with the invention is shown in FIG. 1, which includes a housing 12, which can be mounted onto a pole 14, for example to the positive pole, of a motor vehicle battery (not shown).

A battery terminal 16 is provided in the housing 12 to electrically connect the connection unit 10 to the pole 14 of the motor vehicle battery.

A first conductor section 18, which merges into a second conductor section 20 and is formed by a single conductor, originates from the battery terminal 16. In the transition region from the first conductor section 18 to the second conductor section 20, the conductor 18 splits into a bypass conductor 22 and a main conductor 24, which form the second conductor section 20.

The bypass conductor 22 and the main conductor 24 each end in an interface 28, 30, which is provided at a side 26 of the housing 12, and which serves for the connection of at least one electrical and/or electronic component to the connection unit 10.

In the embodiment shown in FIG. 1, interface 28 of the bypass conductor 22 is provided for the connection of an electrical motor vehicle onboard network and the interface 30 of the main conductor 24 is provided for the connection of a starter and of a generator.

Interfaces 28, 30 are preferably formed by plug parts that can be plugged together with plug parts that are made in a correspondingly complementary manner and that are provided at a wiring harness of the onboard network or at a wiring harness leading to the starter and to the generator.

Sensor 32, which serves for the measurement of the total battery current flowing through the first conductor section 18 of the battery voltage and of the temperature of the battery, is arranged on a circuit board 31 in the first conductor section 18. The sensor 32 has a shunt resistor to permit a subsequent calibration of the sensor 32.

The sensor 32 is connected via a lead 33 to an evaluation unit 34, by which measured signals output by the sensor 32 can be evaluated. The evaluation unit 34 can be integrated into a central computing unit of the motor vehicle or can be made as a separate module and forms, in addition to the sensor 32, a component of a battery management system of the motor vehicle.

An interruption unit 36 is arranged at the main conductor 24 and permits a reversible or irreversible electrical interruption of the main conductor 24. The interruption unit 36 has a pyrotechnically actuable isolation element (not shown), which isolates the main conductor 24 mechanically on an activation of the interruption unit 36. The starter connected to the main conductor 24 and the connected generator can be isolated from the battery electrically by an actuation of the interruption element, for example in the event of an accident.

The interruption unit 36 can be activated via a lead 38 by a signal supplied from outside the evaluation unit 10, i.e. therefore by an external signal. The external signal can, for example, be a signal that is also used for the activation of an airbag.

A second embodiment of the connection unit 10 in accordance with the invention is shown in FIG. 2, which substantially differs from the first embodiment shown in FIG. 1 in that the sensor 32 is not arranged in the first conductor section 18, but at the bypass conductor 22.

Unlike in the first embodiment shown in FIG. 1, it is not the total battery current that can be measured by the arrangement of the sensor 32 at the bypass conductor 22, but only a part flow, namely the part of the battery flow flowing through the bypass conductor 22.

In a further difference from the first embodiment, the main conductor 24 of the second embodiment is provided only for the connection of the starter to the battery pole 14, whereas both the onboard network and the generator are to be connected to the battery via the bypass conductor 22.

A third embodiment of the connection unit 10 in accordance with the invention is shown in FIG. 3, which differs from the second embodiment shown in FIG. 2 in that, similarly to the first embodiment shown in FIG. 1, the bypass conductor 22 is provided for the connection of a motor vehicle onboard network and the main conductor 24 is provided for the connection of a starter and of a generator of the motor vehicle.

In a further difference from the second embodiment, a first sensor 40 is arranged at the bypass conductor 22 and a second sensor 42 is arranged at the main conductor 24 in the third embodiment. Not only the current consumption by the onboard network, but also the current consumption by the starter or the charging current generated by the generator can therefore be monitored by the sensors 40, 42. The sensors 40, 42 are arranged on a circuit board 44 and, similar to the sensor 32 of the previous embodiments, permit a monitoring of the battery temperature.

As in the previously described embodiment, the interruption unit 36 of the third embodiment can also be activated by means of an external signal.

A fourth embodiment of the connection unit 10 in accordance with the invention is shown in FIG. 4, which only differs from the third embodiment shown in FIG. 3 in that the interruption unit 36 cannot be activated by an external signal, but only by an internal signal generated by the sensors 40, 42. The interruption unit 36 is connected to the circuit board 44 via a lead 46 for this purpose.

Instead of an external activation of the interruption unit 36 by an airbag signal, for example, an electrical isolation of the starter and of the generator from the battery is therefore exclusively effected internally here by the sensors 40, 42, for example when the sensor 42 monitoring the main conductor 24 detects a current strength exceeding a predetermined threshold value or finds a current flow in an unwanted direction.

Although the activation of the interruption unit 36 by an internal signal was only described in connection with the fourth embodiment shown in FIG. 4, it must be pointed out that an internal activation of the interruption unit 36 of this kind can also be realized in the first to third embodiments shown in FIGS. 1 to 3, and indeed in addition or alternatively to the explained external activation of the interruption unit 36. Only a corresponding wiring of the interruption unit 36 with the sensor 32 or the sensors 40, 42 is required.

The invention claimed is:

1. A connection unit for the connection of electrical and/or electronic components to a pole of a motor vehicle battery, comprising:

a first conductor section having a first conductor connectable to the battery pole;

a second conductor section that originates from the first conductor section and includes a bypass conductor and a main conductor, to which at least one electrical and/or electronic component can be connected in each case;

an interruption unit, by which an electrical and/or electronic component connected to the main conductor can be electrically isolated from the battery; the bypass conductor being uninterrupted so that an electrical and/or electronic component connected to the bypass conductor cannot be isolated from the battery by the connection unit; and a sensor for the measurement of a battery current and/or of a battery voltage having a lead for connection to an external evaluation unit for a motor vehicle battery management system wherein the sensor is arranged in the second conductor section and connected directly to the bypass conductor.

2. A connection unit for the connection of electrical and/or electronic components to a pole of a motor vehicle battery, comprising:

a first conductor section having a first conductor connectable to the battery pole;

a second conductor section that originates from the first conductor section and includes a bypass conductor and a main conductor, to which at least one electrical and/or electronic component can be connected in each case;

an interruption unit, by which an electrical and/or electronic component connected to the main conductor can be electrically isolated from the battery; the bypass conductor being uninterrupted so that an electrical and/or electronic component connected to the bypass conductor cannot be isolated from the battery by the connection unit; and a sensor for the measurement of a battery current and/or of a battery voltage having a lead for connection to an external evaluation unit for a motor vehicle battery management system, wherein the sensor is arranged in the first conductor section and directly connected to the first conductor.

3. A connection unit in accordance with claim 2, further comprising a respective interface for the connection: (a) of an electrical and/or electronic onboard network of the motor vehicle to the bypass conductor; and (b) of a starter and of a generator of the motor vehicle to the main conductor.

4. A connection unit in accordance with claim 2, further comprising a respective interface for the connection: (a) of an electrical and/or of an electronic onboard network and of a generator of the motor vehicle to the bypass conductor; (b) and of a starter of the motor vehicle to the main conductor.

5. A connection unit in accordance with claim 2, wherein the interruption unit is configured to be activated in dependence on a measured value output by the at least one sensor.

* * * * *